United States Patent [19]

Drexler et al.

[11] Patent Number: 4,863,819
[45] Date of Patent: Sep. 5, 1989

[54] READ-ONLY OPTICAL DATA CARD

[75] Inventors: Jerome Drexler, Los Altos Hills; Eric W. Bouldin, Atherton, both of Calif.

[73] Assignee: Drexler Technology Corporation, Mountain View, Calif.

[21] Appl. No.: 211,146

[22] Filed: Jun. 22, 1988

Related U.S. Application Data

[63] Continuation of Ser. No. 906,114, Sep. 11, 1986, abandoned.

[51] Int. Cl.$^4$ .......................... G03C 1/00; G03C 1/02; G11B 7/00; G11B 11/03
[52] U.S. Cl. ......................................... 430/14; 430/10; 430/11; 430/12; 430/13; 430/15; 430/945; 430/964; 430/17; 430/394; 430/401; 430/524; 430/525; 346/135.1; 346/76 L; 235/487; 369/84; 369/85; 369/86; 428/913
[58] Field of Search ....................... 430/10, 11, 12, 14, 430/15, 945, 964, 17, 394, 401, 524, 525; 346/135.1, 76 L; 428/913; 235/487; 369/84, 85, 86

[56] References Cited

U.S. PATENT DOCUMENTS

| | | | |
|---|---|---|---|
| 3,479,754 | 4/1986 | Maurer | 430/10 |
| 3,701,663 | 10/1972 | Kondo et al. | 96/86 |
| 4,150,398 | 4/1979 | Kojima et al. | 430/945 |
| 4,239,338 | 12/1980 | Borrelli et al. | 350/155 |
| 4,270,130 | 5/1981 | Houle et al. | 346/135.1 |
| 4,278,756 | 7/1981 | Bouldin et al. | 430/414 |
| 4,304,848 | 12/1981 | Bouldin et al. | 430/401 |

(List continued on next page.)

FOREIGN PATENT DOCUMENTS

| | | |
|---|---|---|
| 158906 | 10/1985 | European Pat. Off. . |
| 0202458 | 11/1986 | European Pat. Off. . |
| 2620283 | 11/1976 | Fed. Rep. of Germany . |

OTHER PUBLICATIONS

Nelson, Carle, Microfilm Technology, pp. 185-210, 1965.
Xidex Micrographics, Vesicular and Diazo Film, no date; 4 pages.
Xidex Corp., "Vesicular Duplication", Innovator, 4/1984, 4 pages.
Xidex Corp., "Diazo Duplication", Innovator, 1/1984, 4 pages.
Howe, D. G. et al., Photo. Sci & Eng., vol. 23, No. 6, 11-12/1979, pp. 370-374.
Sporer, A. H., J. of Applied Photo. Eng., vol. 8, No. 5, pp. 200-203, 10/1982.

*Primary Examiner*—Charles L. Bowers, Jr.
*Attorney, Agent, or Firm*—Thomas Schneck

[57] ABSTRACT

A data card comprising a self-supporting, wallet size plastic card base upon which is disposed a film substrate layer, a highly reflective layer and an optical storage layer which is a selected photosensitive layer which has been exposed at an actinic wavelength and developed to be substantially opaque over a portion of its extent, except for an imagewise exposure pattern of clear and partially clear data marks revealing to varying extends reflectivity in the underlying reflective layer. Data spots may have one of four different reflectivities thereby representing a quadrinary digit 0, 1, 2 or 3 replacing two binary digits. The reflective layer is matched to the selected optical storage layer so that the reflective layer is highly reflective at a read beam wavelength in the red or near infrared and less reflective at actinic wavelengths either in the blue/green range or in the ultraviolet. A double-sided data card with a transparent card base and two film substrate layers, two reflective layers and two optical storage layers is also disclosed. A method for forming the data cards comprises vacuum or vapor deposition of the reflective layer over the substrate layer, disposing the photosensitive layer over the reflective layer, making an imagewise exposure of the emulsion at actinic wavelengths through a multilevel opacity mask, developing the photosensitive layer opaque and disposing the resulting strip onto the card base. The photosensitive layers may be silver-halide, diazo or vesicular film emulsions.

9 Claims, 3 Drawing Sheets

DEVELOPED

U.S. PATENT DOCUMENTS

| | | | |
|---|---|---|---|
| 4,359,750 | 11/1982 | Howe | 346/135.1 |
| 4,374,911 | 2/1983 | Hartley | 430/5 |
| 4,387,381 | 6/1983 | Bell | 346/135.1 |
| 4,394,661 | 7/1983 | Peeters | 346/135.1 |
| 4,414,273 | 11/1983 | Wada et al. | 428/913 |
| 4,493,887 | 1/1985 | Peeters et al. | 345/135.1 |
| 4,503,135 | 3/1985 | Drexler | 430/12 |
| 4,542,288 | 9/1985 | Drexler | 235/487 |
| 4,572,891 | 2/1986 | Drexler | 430/12 |
| 4,578,788 | 3/1986 | Ahn et al. | 346/135.1 |
| 4,588,665 | 5/1986 | Drexler | 430/12 |
| 4,603,099 | 7/1986 | Drexler | 430/12 |
| 4,634,850 | 1/1987 | Pierce et al. | 235/462 |
| 4,642,803 | 2/1987 | Drexler | 369/101 |
| 4,665,004 | 5/1987 | Drexler | 430/12 |
| 4,673,626 | 6/1987 | Takeda et al. | 430/11 |
| 4,680,458 | 7/1987 | Drexler | 430/10 |

UNEXPOSED
FIG._5A.

WITH MASK
FIG._5B.

EXPOSED
FIG._5C.

DEVELOPED
FIG._5D.

FIG._7.

READ-ONLY OPTICAL DATA CARD

This is a continuation of co-pending application Ser. No. 906,114 filed on 9/11/86, now abandoned.

TECHNICAL FIELD

The present invention relates to optical data storage media, particularly those with a card format, and in particular to a data card with improved optical data density.

BACKGROUND ART

In U.S. Pat. No. 4,239,338, Borrelli et al. teach an optical information storage medium comprising a glass substrate, a 1000 Angstrom thick silver layer applied to the substrate, an oxide layer deposited over the silver layer and a multilayer additively colored AgCl/PbO film applied over the oxide layer. The film is optically bleachable using visible light to produce a dichroic, birefringent image. The image is read in infrared light, since the film is transparent at infrared wavelengths. The silver layer permits reading and writing in the reflective mode. The film should have a thickness not exceeding about two microns to permit high spot resolution.

In U.S. Pat. No. 4,278,756, Bouldin et al. teach a reflective laser recording and data storage medium formed from a photosensitive silver-halide emulsion. The emulsion is exposed and developed using a negative silver diffusion transfer process to make the film surface shiny compared to data spots which are clear or dark. The shiny surface may be above or below the main body of the emulsion depending on whether the reading light is to be introduced from above or from below through a clear substrate.

In U.S. Pat. No. 4,542,288, Drexler teaches use of a data card having the media of the kind described in U.S. Pat. No. 4,278,756. Certain information, such as servo tracks and data base information, can be prerecorded photolithographically.

In reflective optical data storage media, high optical contrast between data spots and the media background and sharply defined data spots are necessary for resolving data, particularly where data spots are small, i.e. ten microns or less in size. Improved resolution allows for greater data densities, but is sometimes difficult to achieve. For example, optical contrast may be increased in some media by adding a reflective layer, increasing the reflectivity of an already existing reflective layer, or by decreasing the reflectivity of a photosensitive layer, such as by increasing its thickness. Data density may be increased by reducing the size of data spots. Unfortunately, data spots are often blurred in the process of increasing contrast and shrinking spot sizes due to resolving capability of the media and other effects, such as halation. Halation is distortion seen as blurred or diffuse images caused by reflection of image rays off the back of a photosensitive recording layer thereby setting a lower limit on resolvable spot sizes. Antihalation layers added to some media, reduce the reflectivity from the back of the emulsion layer to produce sharp data spots, but also lower optical contrast Some media, such as that described in U.S. Pat. No. 4,239,338, limit the thickness of the recording layer.

An object of the invention is to increase the data density of reflective media applicable to optical data cards without also increasing the effects of halation and resultant blurring of data spots.

Another object is to create a very high data contrast optical media which is less susceptible to data errors from dust, dirt and scratches.

DISCLOSURE OF THE INVENTION

One object has been met in a read only data card for pre-recorded optical data in which data density is increased without reducing data spot sizes with each data spot representing two binary bits. The storage medium is formed from a very thin reflective metallic layer behind a photosensitive material layer such that prerecording is accomplished by exposure to actinic radiation through a multilevel opacity mask and subsequent development to produce data spots with at least two discrete optical densities and preferably about four optical densities. Each data spot, including data areas which are part of the background, may, for example, have one of four different reflectivities representing one of four quadrinary digits, 0, 1, 2 and 3. Thus each data spot stores the equivalent of two binary digits, effectively doubling the data density. The reflective metallic layer is preferably matched to optical properties of a selected photosensitive layer so that the metallic layer is substantially reflective at the reading wavelength, thereby improving optical contrast, and less reflective at a shorter actinic wavelength, thereby allowing a thicker than usual photosensitive layer without increased halation during pre-recording.

The second object is met by using only two optical density levels and therefore only one bit is stored per data spot but the data contrast is very high resulting in improved data error rates when the card is subject to dust, dirt and scratches.

The optical data card comprises a self-supporting, wallet-size, planar plastic card base, a film substrate layer disposed over the base in intimate planar contact therewith, the highly reflective metallic layer, vapor or vacuum deposited on the film substrate layer or a foil bonded to the substrate layer, and a planar optical storage layer disposed over the reflective layer. The optical storage layer may be formed from a photosensitive, silver-halide emulsion by exposure to actinic radiation and development. The resulting optical storage layer is typically a photographic type gelatin layer which has a suspension of black filamentary silver particles within it. Alternatively, the optical storage layer may be formed from material having a radiation sensitive diazo compound. The material is exposed to radiation and developed to form an azo dye image layer. The optical storage layer may also be formed from a photosensitive vesicular material layer comprising light scattering gas vesicles in a plastic emulsion. A transparent planar protective layer may be disposed over the optical storage layer. In a double-sided embodiment of the data card, the card base is transparent and additional layers, comprising an optical storage layer, a reflective metallic layer and a support layer, are disposed between the card base and the film substrate layer.

For a reading beam wavelength in the red or near infrared, the reflective metallic layer may be selected from gold or copper, where the actinic wavelength used in pre-recording is in the blue to green range of wavelengths, and aluminum or silver, where the actinic wavelength of the selected photosensitive medium is preferable in the ultraviolet but usable in the blue or green range of wave lengths. The medium is useful for prerecording data because it can be patterned with information. An imagewise exposure of the photosensitive layer is made with radiation at the actinic wavelength through a multilevel opacity mask. Then, the photosensitive layer is processed to be substantially opaque for maximum actinic exposure, but with an exposure pattern of clear and partially clear image marks, representing pre-recorded data, revealing to varying extent a high reflectivity from the underlying metallic layer for light of reading beam wavelength. This layer is the optical storage layer and is no longer photosensitive after it has been processed, thus forming a read-only storage layer.

BEST MODE FOR CARRYING OUT THE INVENTION

Figure 1:
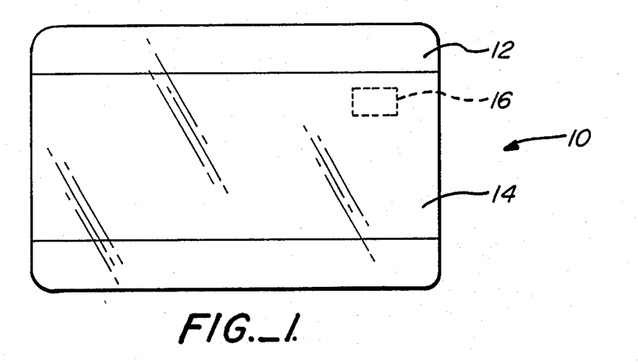
FIG. 1 is a top plan of a data card of the present invention.

With reference to FIG. 1, a data card 10 comprises a self-supporting, wallet-size, planar plastic base 12 with a strip 14 of recording material disposed thereon. Strip 14 may be either single sided, as described below with reference to FIGS. 3 and 3a, or double sided, as described below with reference to FIG. 4. Base 12 may be either transparent or opaque, but must be transparent where strip 14 is double sided. Typically, card base 12 is composed of polycarbonate material, although other suitable materials may also be used. A transparent, planar, protective layer of scratch resistant material may be disposed over strip 14. A preferred size for card 10 is approximately 54 mm by 85 mm, since this size is conventional for credit cards and the like, and easily fits into a wallet. Strip 14 is typically 16 mm or 35 mm wide and extends the length of the card. These dimensions are not critical however.

Figure 2:
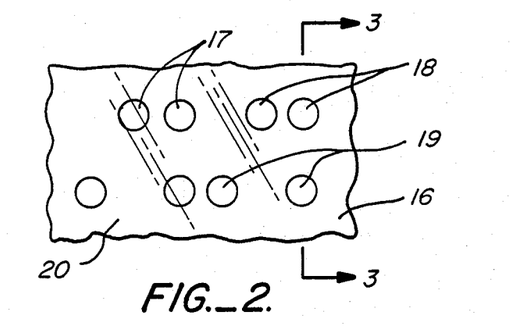
FIG. 2 is an enlarged portion of the data card of FIG. 1 revealing data spots.

With reference to FIG. 2, a magnified view of prerecorded data on the strip 14 may be seen. The border 16, corresponds to dashed line 16 in FIG. 1. Data spots 17 and 18 are seen here to be circular and aligned in paths. Data spots also may be oblong, rectangular or square. A second group of data spots, including spots 19, is seen to be aligned in a second path. Spots 17, 18 and 19, as well as an absence of spots 20, represent quadrinary data digits. Spots 17, 18 and 19 are distinguishable from each other and from background areas 20. For example, spots 18 may represent 3's, spots 19 may represent 2's, spots 17 may represent 1's and the absence of spots 20 may represent 0's. Thus, each recorded data spot represents two binary bits instead of one, thereby effectively doubling the data density without shrinking the data spots. Data spots 17, 18 and 19 are typically reflective to varying degrees, with a reflectivity at near infrared wavelengths (0.7 to 1.0 microns) generally greater than 60% and preferably about 80% for spots 18, in the range of 30% to 50% for spots 19, and in the range of 15% to 25% for spots 17 while the media background areas 20 are substantially dark, with a reflectivity at near infrared wavelengths (0.8 to 1.0 microns) generally less than 12% and preferably about 10%. These reflectivities are typical of what would be observed if the material covering the reflective layer were an exposed and developed silver-halide emulsion which becomes the optical storage layer in the form of filamentary silver particles in a gelatin layer. Optical reflective contrast between data spots and the media background is therefore generally about 2 to 1 for each discrete drop in reflectivity at reading beam wavelengths. The photographically derived diazo images are transparent to infrared wavelengths but have opacities (and in this embodiment, reflectivities) similar to silver-based materials in the visible spectrum. The prerecorded spots may be oblong, circular or rectangular. All of the data spots have similar dimensions which are generally less than about 25 microns in size and preferably less than 10 microns in size. The spacing between paths is not critical, and may even be adjoining, provided that the optical reading system is able to easily distinguish between paths.

Figure 3:
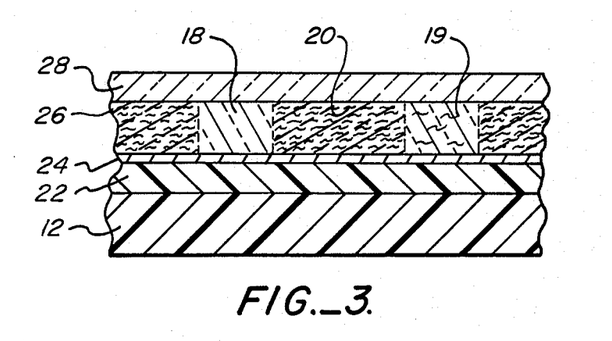
FIG. 3 is a side sectional view of the data card taken along the line 3—3 in FIG. 2.

With reference to FIG. 3, the optical recording media comprises a film substrate layer 22, a reflective metallic layer 24 deposited on substrate layer 22 and an optical storage layer 26 disposed on reflective layer 24. Film substrate layer 22 is disposed over base 12 in intimate contact therewith in planar relation. Base 12 may be transparent or opaque. A transparent, planar protective layer 28 may be disposed over optical storage layer 26.

Film substrate layer 22 is typically about 100 to 250 microns thick, and may be composed of polyesters, cellulose acetate, or other materials commonly used as film bases. Reflective layer 24 is typically composed of either gold, copper, silver or aluminum. Gold is preferred because it has a very high reflectivity at the reading wavelength, thereby giving high data contrast, it does not react with photographic chemicals and is environmentally stable for many years. Also, gold is desirable because it may be used with layers 26 when it is a photographic emulsion with actinic wavelengths in the blue to green wavelength range (0.4 to 0.6 microns) without a serious halation effect. Copper may also be used with emulsions of this type but is not as chemically stable as gold. Silver and aluminum are also preferred materials for use with data storage layers 26, requiring actinic wavelengths in the ultraviolet wavelengths (less than 0.4 microns), but also can be used with longer wavelengths if halation can be controlled. Care must be taken that the aluminum does not contaminate the photographic developer solutions. Reflective layer 24 is deposited on film substrate 22 by well-known vapor or vacuum deposition techniques for example in coating silicon wafers or metallic memory disks. Reflective layer 24 is generally on the order of 10 to 100 nanometers thick when vapor or vacuum deposited.

Optical storage layer 26 is typically formed from a silver-halide emulsion, but other photosensitive materials, such as diazo and vesicular films, may also be used. Emulsion layer 26 may be selected to have an actinic wavelength in which reflective layer 26 has lower reflectivity to minimize halation effects. When silver is used the colloid matrix containing it should be made from material which is substantially transparent to a read beam wavelength in the near infrared, and may be further selected to be substantially more absorptive at an actinic wavelength by adding dyes absorptive at the actinic radiation wavelength thereby enhancing the anti-halation properties of the recording medium. Optical storage layer 26 is generally one to six microns thick. The layer 26 is shown having been exposed through an imagewise exposure pattern to actinic radiation using a photomask and then developed to be substantially dark. Wavy lines in layer 26 represent black filamentary silver embedded in a colloid matrix. The wavy lines might also represent azo or azomethine dye molecules formed in the matrix during development. Optical storage layers formed from vesicular films contain light scattering gas vesicles produced by the decomposition of diazo compounds in a plastic emulsion into a volatile product and subsequent heat development. The recording of the data in these optical storage materials generally takes place before the film is incorporated into the card.

Areas 18 not exposed to actinic radiation are developed to be predominantly clear, revealing a high reflectivity in the underlying metallic layer 24 when illuminated by light of a read beam wavelength, typically in the red or near infrared but in any case longer than the actinic wavelength. Clear areas 18 represent data spots and are preferably sharply defined, rather than diffuse or otherwise blurred. Accordingly, silver-halide and diazo based materials are preferred over vesicular films for forming optical storage layer 26. Areas 19 are exposed to an amount of actinic radiation which is somewhat less intense than the dark background areas 20 of layer 26. When developed areas 19 are gray due to the presence of a few black filamentary silver particles but in a substantially lower concentration than dark areas 20 of layer 26. Gray areas 19 reveal a reflectivity in the underlying highly reflective layer 24 which is not as high as for clear areas 18 since the silver particles present in area 19 absorb some of the incident and reflected light. The optical density of background areas 20 at the read beam wavelength of emulsion layer 26 is typically at least 0.9 and preferably greater than 1.0. The optical density of the spot areas 18 of optical storage layer 26 is typically not more than 0.2 and preferably less than 0.1. Gray areas 19 typically have one of two discrete optical densities, light gray spots with an optical density between 0.6 and 0.8 and dark gray spots with an optical density between 0.3 and 0.5.

A method for making the data card in FIGS. 1–3 comprises depositing reflective layer 24 on film substrate layer 22 by vacuum or vapor deposition or foil bonding and then applying a thin, planar photosensitive coating layer 26 over reflective layer 24. The resulting media may then be prerecorded using the steps of exposure and development described in more detail below with reference to FIGS. 5A–5D and FIG. 6. Strip 14, seen in FIG. 1, containing prerecorded data is the result. This strip 14 is then applied to card base 12 by disposing film substrate layer 22 in intimate planar contact over base 12. A planar, transparent protective layer 28 may finally be adhered over optical storage layer 26.

Figure 3A:
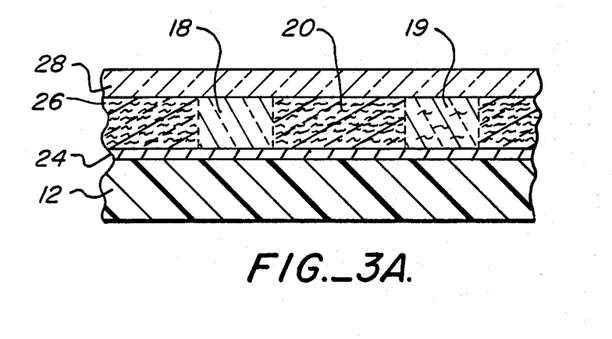
FIG. 3a is a side sectional view similar to FIG. 3 showing an alternate embodiment of the data card of the present invention.

Alternatively, a card may be formed without film substrate layer 22 as seen in FIG. 3a. Reflective layer 24 may be deposited directly onto card base 12 and optical storage layer 26 disposed over reflective layer 24, instead of first forming strip 14 from layers 22, 24, and 26. Also prerecording of data by exposure and development may be performed after disposing strip 14 or the individual layers 24 and 26 to base 12. It is preferred to complete processing of strip 14 first since it will be easier to handle when it is no longer photosensitive.

Figure 4:
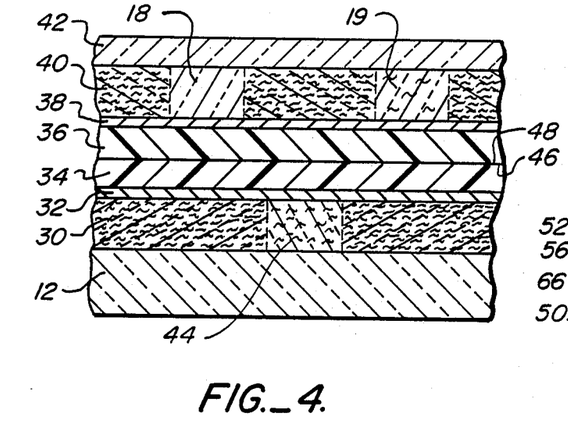
FIG. 4 is a side sectional view similar to FIG. 3 showing a third data card embodiment of the present invention.

With reference to FIG. 4, a double sided embodiment of data card 10 comprises a first optical storage layer 30 disposed over a self-supporting transparent planar plastic card base 12, a first vapor or vacuum deposited reflective layer 32 disposed adjacent a first film substrate layer 34, a second film substrate layer 36 disposed over first substrate 34, a second reflective layer 38 disposed over substrate layer 36, and a second optical storage layer 40 disposed on reflective layer 38. The optical storage layers 30 and 40 typically comprise black filamentary metal particles suspended in a clear photographic quality gelatin matrix. Optical storage layers formed from diazo and vesicular films may also be used. A transparent protective layer 42 may be disposed over optical storage layer 40.

First and second film substrate layers 34 and 36 are substantially similar to film substrate layer 22 in FIG. 3. Highly reflective layers 32 and 38 may be selected from the group consisting of gold, silver, aluminum, and perhaps copper just as for reflective layer 24 in FIG. 3. Layers 32 and 38 may be identical or made of different metals. As with optical storage layer 26 in FIG. 3, each of the thin optical storage layers 30 and 40 in FIG. 4 typically was previously formed by exposing a photosensitive emulsion to actinic radiation and photographically developed. The developed emulsion layers 30 and 40 have an imagewise exposure pattern of clear and partially clear marks 44, 18 and 19 representing data bits with underlying high reflectivity in the adjacent metallic layers 32 and 38 respectively for light of reading wavelength. Optical storage layers 30 and 40 formed from silver-halide emulsions have a high concentration of black filamentary silver particles, represented by wavy lines in FIG. 4, over most of its extent. These areas are approximately 7% to 15% reflective. Clear mark 18 in layer 40 contains no significant amount of filamentary silver, producing an 80% reflectivity. Light gray mark 19 in layer 40 contains a few filamentary silver particles which reduce the overall reflectivity to 60%. Dark gray mark 44 in layer 30 contains more filamentary silver particles than mark 19, but a lower concentration than the dense 10% reflective areas of layer 30. Mark 44 has an overall reflectivity of about 20%. The actinic radiation for exposing emulsion layers 30 and 40 need not be of identical wavelength, and the photosensitive layers may be exposed and developed either at the same time or separately.

Formation of the optical storage media for the double sided data card in FIG. 4 may comprise depositing reflective layers 32 and 38 onto support layers 34 and 36, respectively, by vacuum or vapor deposition or foil bonding. Then photosensitive layers 30 and 40 are disposed on reflective layers 32 and 38, respectively. Photosensitive layers 30 and 40 are then prerecorded as described in detail below with respect to FIGS. 5A–5D and FIG. 6. Each of the resulting strips of optical storage material is substantially similar. Layers 30, 32, and 34 form one strip, while layers 36, 38, and 40 form a second strip. The two strips are then adhered together, with an upper surface 46 of first support layer 34 in intimate planar contact with a lower surface 48 of second support layer 36. One of the optical storage layers, in the present case first optical storage layer 30 is then disposed over transparent card base 12. A protective layer 42 may be disposed over the other optical storage layer, here layer 40. Alternatively, each of the layers may be sequentially disposed over card base 12. Exposure and development of one or more of the emulsion layers 30 and 40 may be performed after disposing onto card base 12, but this is more difficult since the emulsion is photosensitive.

With reference to FIGS. 5A-5D and 6, a photosensitive medium 50 containing an unexposed photosensitive layer 66 is disposed for exposure to actinic radiation. The photosensitive layer is preferably a fine grain silver-halide emulsion. The smaller the grain sizes of the silver-halide emulsion, the higher the resolution of the final pre-recorded, read-only product of this invention. The emulsion grain size should be less than 5% of the recording spot size for best results, and emulsions with grain size on the order of 0.05 microns are commercially available. Antihalation dyes may also be added to the photographic of emulsion to increase the absorptivity of the emulsion at the actinic wavelength. This can help reduce any halation effect and give higher resolutions. Such dyes are commonly used and are water soluble and thus are not present in the final read only optical storage medium.

Compositions containing radiation-sensitive diazo compounds may also be selected. Diazo compounds have at least two directly attached nitrogen atoms which are attached by double or triple bonds. Preferably, the compounds selected should not contain a chromophore group, i.e., the compounds should be transparent prior to exposure and development. Diazo compounds which may be used include diazonium compounds or salts, such as p-N,N-diethylaminobenzenediazonium zinc chloride double salt, diazo-N-sulfonate compounds, quinone diazide compounds and triazene compounds. Polymeric diazonium and quinone diazide compounds, such as diazoformaldehyde resins, may also be used. Vesicular films containing diazo compounds embedded in a plastic polymer matrix may also be used. Diazo and vesicular films are commercially available from Xidex Corporation of Sunnyvale, Calif.

An imagewise exposure of variable intensity can be achieved in several ways. Firstly, a laser beam of a commercial high resolution film recorder can be modulated both spacially and in intensity to expose directly onto the photosensitive layer of this invention.

Alternately, a commercial film recorder can be used to generate a photomask of image-to-image variable opacity. The laser-generated data need be written only once and reproduced many times with a fast incoherent light exposure through the photomask onto the photosensitive layer.

Figure 5A:
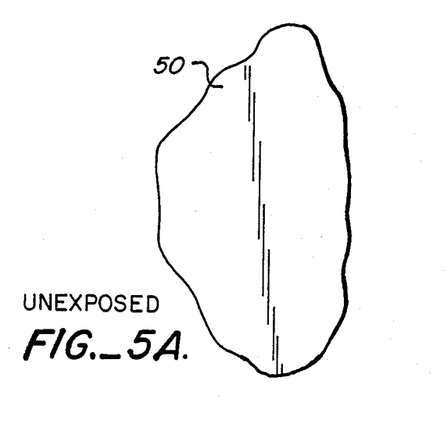
FIGS. 5A-5D are top plan views of portions of the data card of FIG. 1 illustrating a method of prerecording data spots.
Figure 5B:
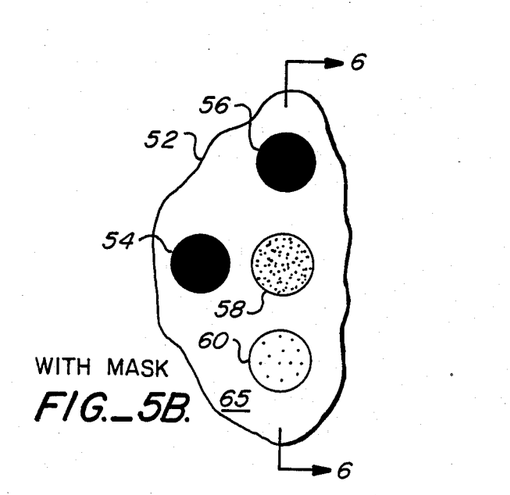
Figure 6:
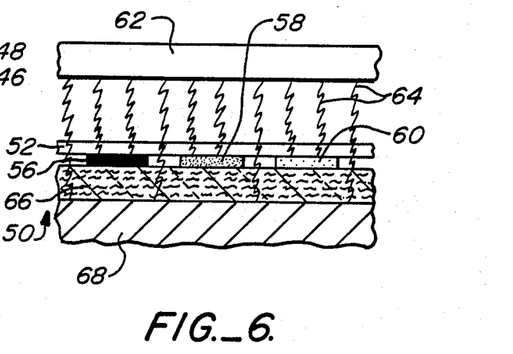
FIG. 6 is a side sectional view taken along the line 6—6 in FIG. 5B.

In FIG. 5b, a multilevel opacity shielding mask 52 is placed over unexposed medium 50. Mask 52 has up to four degrees of transmissivity to actinic radiation, being substantially clear over a portion of its extent, except for an imagewise pattern of optically dense marks 54, 56, 58, 60. Marks 54 and 56 are substantially opaque, with an optical density measured at the actinic wavelength preferably greater than 1.0, mark 58 is a dark gray with an optical density of about 0.7, and mark 60 is a light gray with an optical density of about 0.4. As seen in FIG. 6, recording medium 50 is exposed with a light source 62 emitting light 64 at actinic wavelengths. Exposure through the multilevel opacity mack can occur in a contact printer, as shown, or in a projection printer of a type related to those commercially available from Perkin-Elmer Corporation for semiconductor wafer exposure from a photomask. The material from which the multilevel opacity photomask is made can be a silver-halide emulsion, a chromium-photoresist system, a diazo film or a vesicular film. Typically, the actinic light 64 has a wavelength in a blue-green range of 0.4 to 0.6 microns, although ultraviolet light with wavelengths less than 0.4 microns may also be used. Light 64 illuminating mask 52 is transmitted through clear areas 65 of mask 52 to emulsion layer 66, is partially transmitted through gray marks 58 and 60, but is blocked by dark marks, such as spot 56 of mask 52.

A multilevel opacity photomask suitable for the data geometry sizes of this invention can be prepared on an electron beam system of the type currently being used to generate chromium photomasks for the semiconductor industry. Typically, the electron beam is not modulated in intensity and the photomasks for the semiconductor industry consist of areas either clear or opaque. It is the very high resolution of the electron beam exposure system that makes it useful in preparing a chromium-based multilevel opacity mask. Because the electron beam can write a spot size of 0.5 $\mu$m, a 5 $\mu$m square geometry of this invention consists of 10 by 10 (or 100) potential exposure areas.

When a 5 $\mu$m image is desired to be of minimum opacity on the photomask, all 100 potential exposure areas are indeed exposed onto the photoresist. After development of the resist and etching of the chromium, the image is 100% clear. Multilevels of opacity can be achieved by exposing a certain percentage of the 100 potential exposure areas so that pre-determined levels of chromium remain in the image area after etching. For example, if an opacity of 50% is desired then every other 0.5 micron exposure area would be opaque and adjacent to a clear area. The multilevel opacity mask is then used to expose the photosensitive layer of this invention by means of contact or projection printing.

Figure 5C:
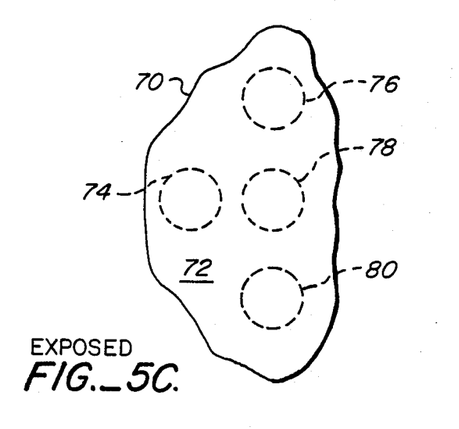

Exposure by the emulsion layer 66 to actinic radiation creates a latent image in which silver halide is activated substantially to saturation under clear areas 65 of mask 52, is somewhat less activated under light gray area 60, is even less activated under dark gray area 58, and remains substantially unactivated under black marks 54 and 56. This latent image is shown in FIG. 5C in which the exposed photosensitive medium 70 contains an emulsion of activated silver halide over substantial regions 72 and unactivated silver halide in spot regions 74 and 76, and a mixture of both activated and unactivated silver halide in spot regions 78 and 80. Compositions containing diazo compounds typically form a latent image when exposed to actinic radiation which may subsequently be developed to form a dye image. Diazo compounds in vesicular films decompose when exposed to actinic radiation forming gases, such as nitrogen and carbon dioxide. The gases produce internal pressures in the plastic matrix in exposed regions of the medium.

Figure 5D:
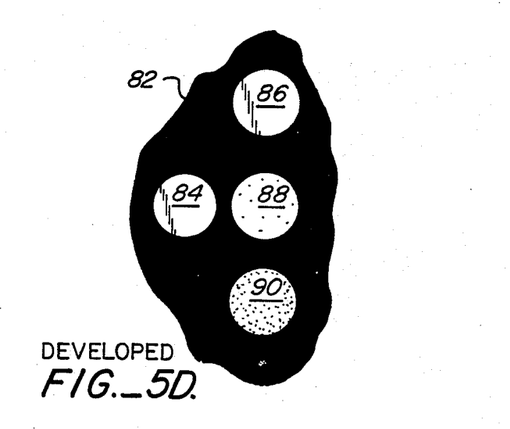

Exposed medium 70 is developed to produce a read only medium 82 which is substantially opaque over a portion of its extent, but having an imagewise exposure pattern of clear and partially clear marks 84, 86, 88 and 90 with reflectivity in the underlying metallic layer 68 for light of reading beam wavelength. When black filamentary silver particles are used to create opaque medium 82, the particles are formed from an activated and developed silver-halide emulsion. The volume concentration of activated silver halide determines the volume concentration of filamentary silver, which in turn determines the optical density of the optical storage layer.

Accordingly, clear spots 84 and 86, contain almost no filamentary silver particles since these spot areas were mostly spots 74 and 76 of unexposed and unactivated silver halide which were under opaque spots 54 and 56 of mask 52. Spot 88 contains a few filamentary silver particles and spot 90 contains even more since these spots were under gray spots 58 and 60 of mask 52 and received some actinic radiation. 10% reflective areas containing dense concentrations filamentary silver should exhibit an optical density as measured with red light of a photographic densitometer of at least 0.9 and preferably greater than 1.0. 20% reflective areas should have an optical density of between 0.6 and 0.8. 40% reflective areas should have an optical density of between 0.3 and 0.5, while the 80% reflective unexposed areas should have densities less than 0.2 and preferably less than 0.1. Subsequent to development, fixing and rinse steps remove the remaining silver halide from optical storage layer 66.

Exposed diazo-type media are developed to form a positive dye image. Accordingly, masks which are the negative of mask 65 in FIG. 5B should be used. During exposure, diazo compounds are converted into a colorless reaction product by ultraviolet light. The remaining diazo compounds can be converted to an azo or azomethine dye by reaction, under alkaline conditions, with chemicals called couplers. Typical couplers include phenol, naphthol, acetoacetanilide, cyclohexylacetoacetic acid amine, pyrazolones, hydroxy pyridones and thiobarbituric acid. In gaseous development, the coupler is in the medium and the exposed medium is contacted with ammonia vapor so as to provide a basic environment for azo dye formation. Temperatures in the range of 65° C. to 90° C. accelerate the coupling process. Preferably, an acidic stabilizer is present in the medium to prevent premature reactions. In liquid development, the coupler may be in a basic solution which is contacted against the surface of the exposed medium. In heat development, heat catalyzes the dye forming reaction by producing a coupler or a basic ingredient, such as ammonia.

Vesicular films are developed by applying heat to soften the plastic polymer matrix. Development temperatures range from 110° C. to 150° C. depending on the type and thickness of the matrix and the dwell time. Two seconds time is required at 110° C. At higher temperatures less time is required. During development, the boundary of the pressure areas due to the gases formed during exposure are pushed out to form vesicles. The vesicles become light scattering centers. Following development, the medium is cleared by exposure to radiation to break down the remaining diazo salts.

Figure 7:
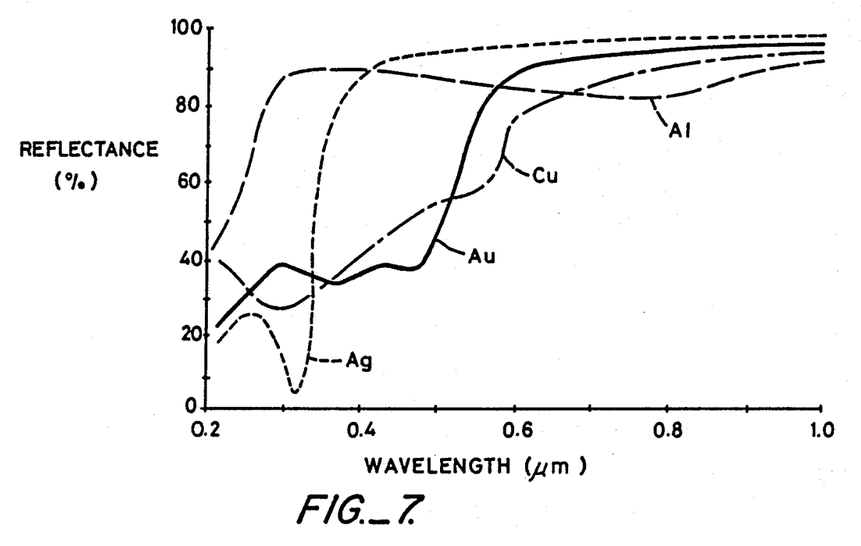
FIG. 7 is a graph showing reflectivity of metallic layers versus wavelength.

When an antihalation dye is not used, effects of halation in silver-halide emulsion layer 66 during exposure to actinic radiation are minimized when the emulsion layer 66 is very thin, i.e. less than 5 microns, and when the metallic layer 68 beneath emulsion layer 66 is less reflective at the wavelengths of the actinic radiation. In FIG. 7, the reflectivities of gold, copper, silver and aluminum at different wavelengths is seen. At the read beam wavelength in the red or near infrared, i.e. a wavelength longer than 0.7 microns, all of the metals have a reflectance of at least 80 percent and all but aluminum have a reflectance greater than 90 percent. Thus, each metal has a high reflectivity to produce a high optical contrast of reflective data spots against a dark background for reading.

Gold and copper are substantially less reflective at a wavelength of actinic light in the range from 0.4 to 0.6 microns, i.e. for blue and green light. For example, gold has a reflectance of approximately 35 to 40 percent for wavelengths less than 0.5 microns. Copper has a reflectance of less than 60 percent for wavelengths shorter than 0.6 microns. These reduced reflectances reduce the halation effects.

Silver and aluminum both have reflectances of greater than 80 percent for wavelengths between 0.4 and 0.6 microns. Accordingly, care must be taken in using silver and aluminum with actinic radiation in this wavelength range. In fact, aluminum has greater reflectance for wavelengths in the 0.4 to 0.6 micron range than for wavelengths in the near infrared range from 0.8 to 1.0 microns. To minimize for halation affects aluminum metallic layers may be used with thinner photosensitive emulsion layers and can still be suitable for emulsions two to three microns thick. Also, commercially available antihalation dyes may be used to absorb some of the actinic radiation.

Silver and aluminum have substantially less reflectance at wavelengths of actinic light in the ultraviolet. In particular, silver has a reflectance of less than 10 percent for wavelengths near 0.3 microns.

The present invention improves data spot contrast in photographic type optical data storage media by using a reflective layer to increase optical contrast at reading wavelengths without causing blurred or diffuse data spots due to halation effects at the actinic wavelengths. Metallic layers behind the photosensitive layer which are highly reflective in the red and near infrared wavelengths enable very high data contrasts to be achieved. Data contrasts of at least three to one and up to seven to one can be achieved which reduces data error rate from dust, dirt and scratches. Alternatively, this very high data contrast can be utilized to store two or more bits per data spot by using gray scale coverage of the reflective layer.

We claim:

1. A data card for wavelength-dependent prerecorded optical information comprising,
   a self-supporting wallet size, planar plastic base,
   a film substrate layer disposed over said base in intimate contact therewith in planar relation,
   a metallic highly reflective layer deposited on said fill substrate layer, and
   a planar prerecorded read-only optical storage layer disposed over the reflective layer, having been exposed when photosensitive at an actinic wavelength and developed to be substantially opaque over a portion of its extent, but having an imagewise exposure pattern of clear and partially clear marks which reveal at least three discrete levels of reflectivity from the underlying reflective layer, said discrete levels of reflectivity differing from the reflectivity of the opaque portion for light of a reading beam having a wavelength longer than that of the actinic radiation, said marks store about the equivalent of two binary digits and represent prerecorded read-only information stored in the optical storage layer.

2. The data card of claim 1 wherein said reflective layer being highly reflective at a reading wavelength, but less reflective at a wavelength actinic relative to a photosensitive layer.

3. The data card of claim 2 wherein said reading beam wavelength is in the red or near infrared range of wavelengths and said actinic wavelength is in the blue to green range of wavelengths.

4. The data card of claim 2 wherein said reading beam wavelength is in the red or near infrared range of wavelengths and said actinic wavelength is in the ultraviolet range of wavelengths.

5. The data card of claim 1 wherein said reflective layer has reflectivity exceeding 80% at 800 nanometers.

6. The data card of claim 1 wherein a transparent, protective, planar layer is disposed over said storage layer.

7. The data card of claim 1 wherein each of said marks with said underlying reflective layer has one of four reflectivities at said reading wavelength, one of said reflectivities being at least 60%, a second of said reflectivities being between 30% and 50%, a third of said reflectivities being between 15% and 25%, a fourth of said reflectivities being at most 12%.

8. The data card of claim 1 wherein said optical storage layer is developed from a photosensitive silver-halide emulsion to form filamentary silver particles in a colloid matrix having an imagewise pattern.

9. The data card of claim 1 wherein said marks represent quadrinary data digits.

* * * * *

UNITED STATES PATENT AND TRADEMARK OFFICE
CERTIFICATE OF CORRECTION

PATENT NO. : 4,863,819

DATED : September 5, 1989

INVENTOR(S) : Drexler et al.

It is certified that error appears in the above-identified patent and that said Letters Patent is hereby corrected as shown below:

Column 10, line 16, "halation affects" should read
- - halation effects - -.

Claim 1, column 10, line 46, "on said fill" should read
- - on said film - -.

Signed and Sealed this

Twenty-fifth Day of February, 1992

Attest:

HARRY F. MANBECK, JR.

*Attesting Officer*     *Commissioner of Patents and Trademarks*